United States Patent
Linowes et al.

(10) Patent No.: US 9,251,472 B1
(45) Date of Patent: Feb. 2, 2016

(54) METHOD AND SYSTEM FOR MONITORING A BUILDING

(71) Applicant: 31NORTH, INC., Atlanta, GA (US)

(72) Inventors: Steve Linowes, Atlanta, GA (US); David Wei Hsu, Decatur, GA (US)

(73) Assignee: 31NORTH, INC., Atlanta, GA (US)

( * ) Notice: Subject to any disclaimer, the term of this patent is extended or adjusted under 35 U.S.C. 154(b) by 226 days.

(21) Appl. No.: 13/626,165

(22) Filed: Sep. 25, 2012

Related U.S. Application Data

(60) Provisional application No. 61/539,291, filed on Sep. 26, 2011.

(51) Int. Cl.
G06F 7/60 (2006.01)
G06F 17/10 (2006.01)
G06N 7/00 (2006.01)

(52) U.S. Cl.
CPC ........................................ *G06N 7/00* (2013.01)

(58) Field of Classification Search
CPC ..... G06F 21/552; G05B 23/0283; G06N 7/00
USPC .......................................................... 703/2
See application file for complete search history.

(56) References Cited

U.S. PATENT DOCUMENTS

| | | | |
|---|---|---|---|
| 7,912,807 B2 | 3/2011 | McLean et al. | |
| 8,180,727 B2 | 5/2012 | McLean et al. | |
| 8,532,835 B2 | 9/2013 | McLean | |
| 2002/0005782 A1* | 1/2002 | Sakai et al. | 340/540 |
| 2003/0043073 A1* | 3/2003 | Gray et al. | 342/465 |
| 2003/0225466 A1* | 12/2003 | Yulevitch et al. | 700/80 |
| 2005/0099288 A1* | 5/2005 | Spitz et al. | 340/506 |
| 2006/0174707 A1* | 8/2006 | Zhang | 73/592 |
| 2008/0062167 A1* | 3/2008 | Boggs et al. | 345/419 |
| 2008/0249756 A1* | 10/2008 | Chaisuparasmikul | 703/13 |
| 2009/0292509 A1* | 11/2009 | Thompson et al. | 703/1 |
| 2010/0106674 A1 | 4/2010 | McLean et al. | |
| 2010/0332044 A1 | 12/2010 | McLean | |
| 2011/0161250 A1 | 6/2011 | Koeppel et al. | |
| 2011/0213588 A1* | 9/2011 | Lin et al. | 702/181 |
| 2012/0016638 A1 | 1/2012 | McLean et al. | |
| 2012/0271784 A1 | 10/2012 | McLean et al. | |
| 2012/0276517 A1* | 11/2012 | Banaszuk et al. | 434/365 |
| 2014/0039832 A1 | 2/2014 | McLean | |

OTHER PUBLICATIONS

Ye Du, Huiqiang Wang, Yonggang Pang, "A Hidden Markov Models-Based Anomaly Intrusion Detection Method" IEEE, 2004, pp. 4348-4351.*

Brian Sallans, Dietmar Bruckner, Gerhard Russ, "Statistical Detection of Alarm Conditions in Building Automation Systems" IEEE, 2006, pp. 257-262.*

(Continued)

*Primary Examiner* — Dwin M Craig
(74) *Attorney, Agent, or Firm* — DLA Piper LLP (US)

(57) ABSTRACT

A computerized method and system for monitoring a building, including: accepting data regarding building operation data, generating a statistical model based on the data, comparing current building performance to the statistical model, determining whether the current building performance is normal or abnormal, and displaying information indicating abnormal and/or normal operating conditions.

26 Claims, 13 Drawing Sheets

(56) References Cited

OTHER PUBLICATIONS http://www.firstfuel.com/home/how_it_works, downloaded from web.archive.org archived on Jun. 15, 2012 (7 pages).

http://www.retroficiency.com/products, downloaded from web.archive.org archived on Sep. 11, 2012, (2 pages).

Natasa Djuric, "Real-Time Supervision of Building HVAC System Performance", Doctoral thesis, Norwegian University of Science and Technology (217 pages) (2008).

Tim Salsbury et al., "Performance Validation and Energy Analysis of HVAC Systems Using Simulation", Energy and Building, vol. 32, No. 1, pp. 5-17 (2000).

http://www.siemens.com, downloaded from web.archive.org archived on Sep. 22, 2012 (81 pages).

http://www.honeywell.com, downloaded from web.archive.org archived on Sep. 24, 2012 (49 pages).

http://Johnsoncontrols.com, downloaded from web.archive.org archived on Sep. 20, 2012 (40 pages).

\* cited by examiner

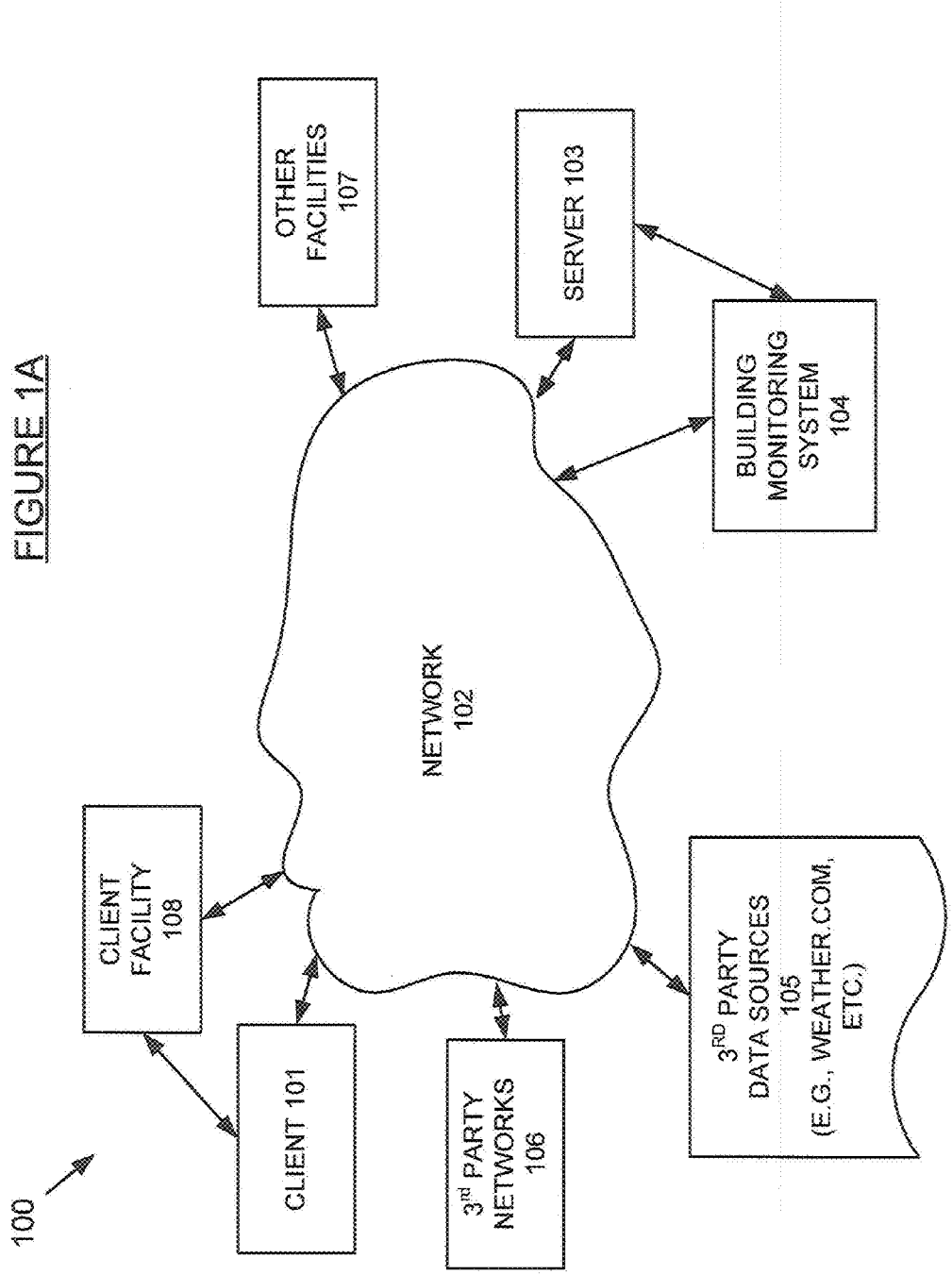

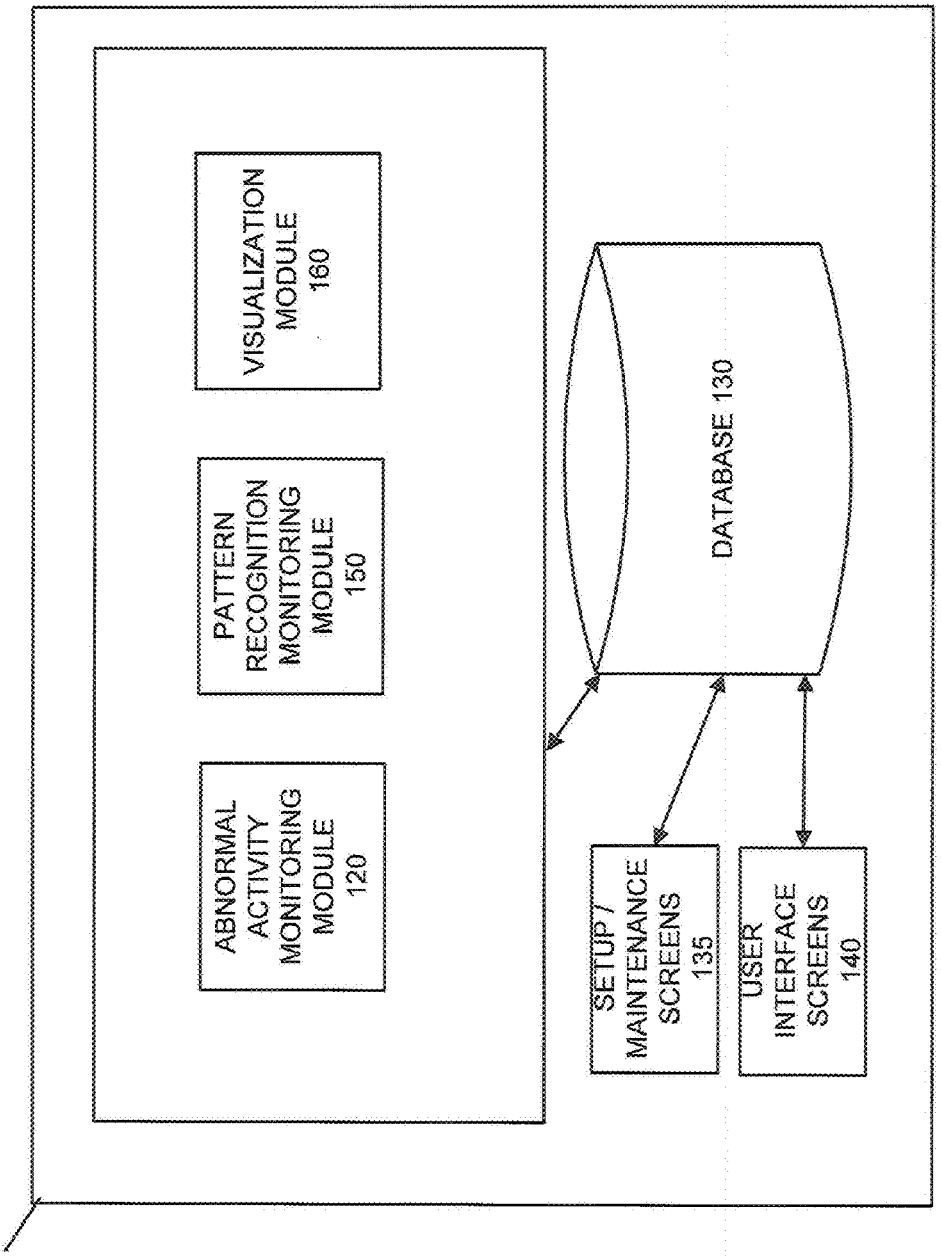

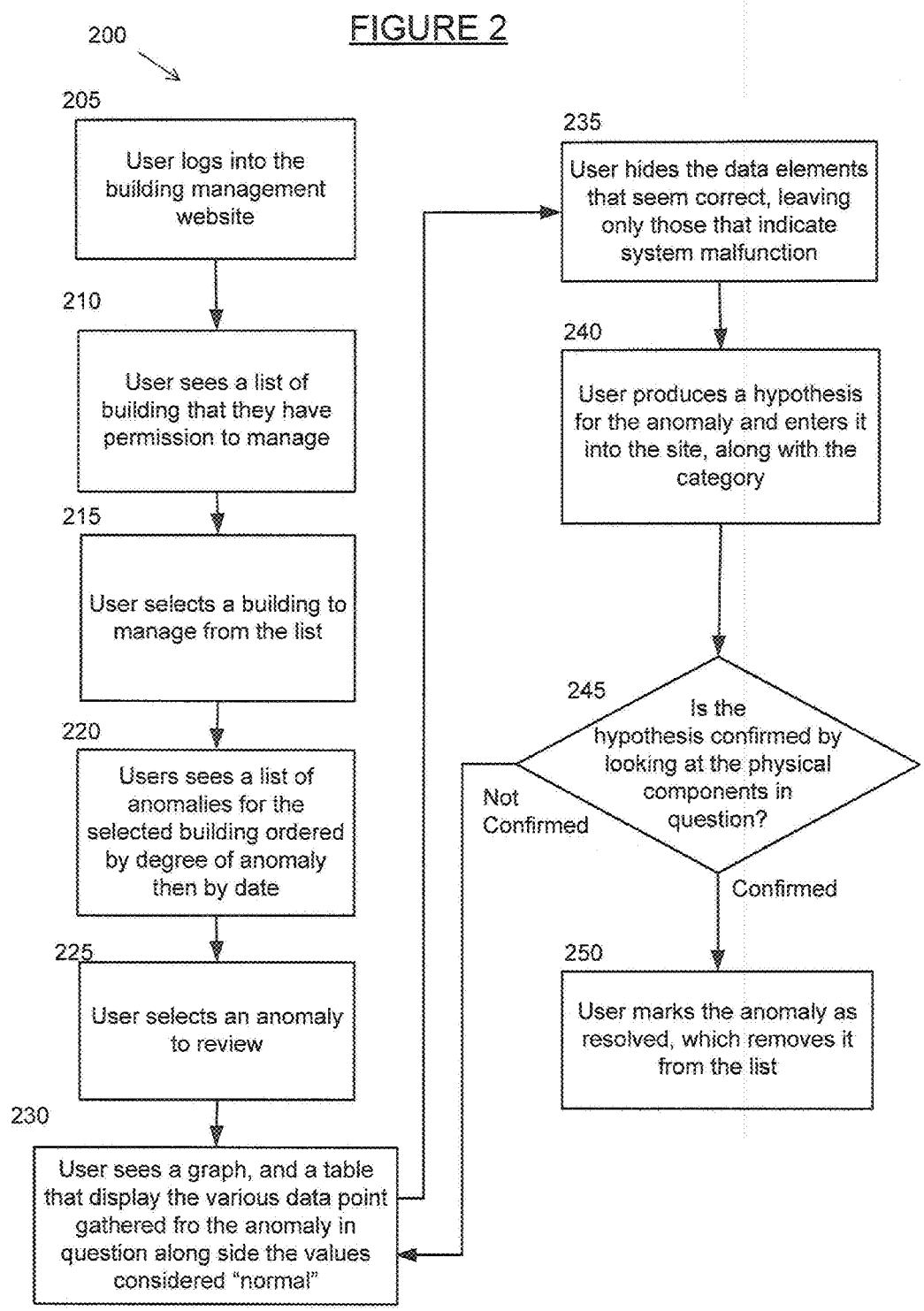

FIGURE 4

Building Manager Summary

| Home | About | Contact | | | | | | |
|---|---|---|---|---|---|---|---|---|
| OWNER HOME | | | | Today is: Monday, January 17 | | Welcome, Building Manage 1  SIGN OUT | | |
| Properties | | | | TOTAL CO₂ SAVINGS 6,346 LBS | TOTAL COST SAVINGS $13,241 | MANAGE USERS  MANAGE BUILDINGS  ACCOUNT SETTINGS  UPGRADE TO PREMIUM | | |

405 → 410

| ▽ 999 Peachtree | PROPERTY SUMMARY | | | | | | | |
|---|---|---|---|---|---|---|---|---|
| 999 Peachtree St NE Atlanta, GA 30309 | RESULTS | ISSUES | | | | | | |
| FLOORS: 28  AHUS: 32 HVAC: Central  BAS: Johnson | DETAILS | | 415 420 425 | 430 | 435 | 440 SORT BY IMPACT ▼ | 445 | |
| | | | | | ANNUAL SAVINGS | | | |
| SUMMARY | CONSUMPTION | NAME | SYSTEM | DATE & TIME FIXED | IMPACT | CO2 | COST | ENERGY |
| COMPONENTS | BENCHMARKS | Automation ADJ | HVAC | xx/xx/xx xx:xx AM | ■■■■■ | 156 LBS | $785.25 | 2,222 KWh |
| △ 1250 Broadway | | Lighting Automate | ELEC | xx/xx/xx xx:xx AM | ■■■■■ | 123 LBS | $721.12 | 1,932 KWh |
| △ Georgia Tower | | Data CTR ADJ | IT | xx/xx/xx xx:xx AM | ■■■■ | 99 LBS | $657.01 | 976 KWh |
| △ 156 Huff St. | | FL 25 TS 12 | HVAC | xx/xx/xx xx:xx AM | ■■■■ | 92.6 LBS | $487.25 | 801 KWh |
| | | Basement Adjust | ELEC | xx/xx/xx xx:xx AM | ■■■■ | 91 LBS | $333.24 | 798 KWh |
| | | FL6 245 | HVAC | xx/xx/xx xx:xx AM | ■■■■ | 90 LBS | $314.23 | 724 KWh |
| | | Temp Flux | HVAC | xx/xx/xx xx:xx AM | ■■■ | 82.3 LBS | $299.89 | 645 KWh |
| | | Ext Therm | ELEC | xx/xx/xx xx:xx AM | ■■■ | 67.6 LBS | $200.09 | 657 KWh |
| | | FL5 TS 14 | HVAC | xx/xx/xx xx:xx AM | ■■ | 60 LBS | $234.56 | 456 KWh |
| | | HVAC Auto Adj | HVAC | xx/xx/xx xx:xx AM | ■■ | 53 LBS | $189.00 | 562 KWh |
| | | FL 24 Kitchen | HVAC | xx/xx/xx xx:xx AM | ■■ | 49.5 LBS | $175.45 | 267 KWh |
| | | Data CTR ADJ MED | IT | xx/xx/xx xx:xx AM | ■■ | 49 LBS | $172.34 | 222 KWh |
| | | FL5 TS 15 | HVAC | xx/xx/xx xx:xx AM | ■ | 34 LBS | $171.49 | 189 KWh |
| | | Lighting Basement | HVAC | xx/xx/xx xx:xx AM | ■ | 28.78 LBS | $112.12 | 152 KWh |
| | | FL 25 Storage | HVAC | xx/xx/xx xx:xx AM | ■ | 26.2 LBS | $98.01 | 98 KWh |
| | | FL 34 Storage | HVAC | xx/xx/xx xx:xx AM | ■ | 12 LBS | $99.87 | 56 KWh |
| | | FL 5 TS 12 | HVAC | xx/xx/xx xx:xx AM | □ | 6.15 LBS | $80.70 | 43 KWh |
| | | FL 12 Kitchen | HVAC | xx/xx/xx xx:xx AM | □ | 6.23 LBS | $75.46 | 19 KWh |

FIGURE 5
FACILITIES MANAGER SUMMARY

| Home | About | Contact |
|---|---|---|

FACILITIES HOME

999 Peachtree
999 Peachtree St NE
Atlanta, GA 30309

FLOORS: 28  AHUS: 32
HVAC: Central  BAS: Johnson

| SUMMARY | CONSUMPTION |
|---|---|
| COMPONENTS | BENCHMARKS |

Today is: Monday, January 17  Welcome, Facilities Manager 1  SIGN OUT
TOTAL CO₂ SAVINGS: 6,346 LBS  TOTAL COST SAVINGS: $13,241  42° 48° High / 31° Low  EDIT PROFILE

PROPERTY SUMMARY

| ISSUES | RESULTS |
|---|---|

SORT BY IMPACT ▼ — 505

| NAME | SYSTEM | DATE & TIME DETECTED | IMPACT | RECOMMENDATION | | |
|---|---|---|---|---|---|---|
| Automation ADJ | HVAC | xx/xx/xx xx:xx AM | ▇▇▇▇ | ADJ AUTO | ANALYZE | FIX |
| Lighting Automate | ELEC | xx/xx/xx xx:xx AM | ▇▇▇▇ | ADJ AUTO | ANALYZE | FIX |
| Data CTR ADJ | IT | xx/xx/xx xx:xx AM | ▇▇▇▇ | DIAGNOSE IT | ANALYZE | FIX |
| FL 25 TS 12 | HVAC | xx/xx/xx xx:xx AM | ▇▇▇▇ | DIAGNOSE TS | ANALYZE | FIX |
| Basement Adjust | ELEC | xx/xx/xx xx:xx AM | ▇▇▇▇ | STOP TX | ANALYZE | FIX |
| FL6 245 | HVAC | xx/xx/xx xx:xx AM | ▇▇▇ | AUTO FIX | ANALYZE | FIX |
| Temp Flux | HVAC | xx/xx/xx xx:xx AM | ▇▇▇ | STOP TS12 | ANALYZE | FIX |
| Ext Therm | ELEC | xx/xx/xx xx:xx AM | ▇▇▇ | STOP 12 | ANALYZE | FIX |
| FL5 TS 14 | HVAC | xx/xx/xx xx:xx AM | ▇▇▇ | ADJ AUTO | ANALYZE | FIX |
| HVAC Auto Adj | HVAC | xx/xx/xx xx:xx AM | ▇▇ | DIAGNOSE TS | ANALYZE | FIX |
| FL 24 Kitchen | HVAC | xx/xx/xx xx:xx AM | ▇▇ | ADJ AUTO | ANALYZE | FIX |
| Data CTR ADJ MED | IT | xx/xx/xx xx:xx AM | ▇▇ | AUTO DIAG | ANALYZE | FIX |
| FL5 TS 15 | HVAC | xx/xx/xx xx:xx AM | ▇▇ | ADJ AUTO | ANALYZE | FIX |
| Lighting Basement | HVAC | xx/xx/xx xx:xx AM | ▇ | DIAGNOSE TS | ANALYZE | FIX |
| FL 25 Storage | HVAC | xx/xx/xx xx:xx AM | ▇ | DIAGNOSE TS | ANALYZE | FIX |
| FL 34 Storage | HVAC | xx/xx/xx xx:xx AM | ▇ | DIAGNOSE TS | ANALYZE | FIX |
| FL 5 TS 12 | HVAC | xx/xx/xx xx:xx AM | ▇ | DIAGNOSE TS | ANALYZE | FIX |
| FL 12 Kitchen | HVAC | xx/xx/xx xx:xx AM | ▇ | AUTO FIX | ANALYZE | FIX |

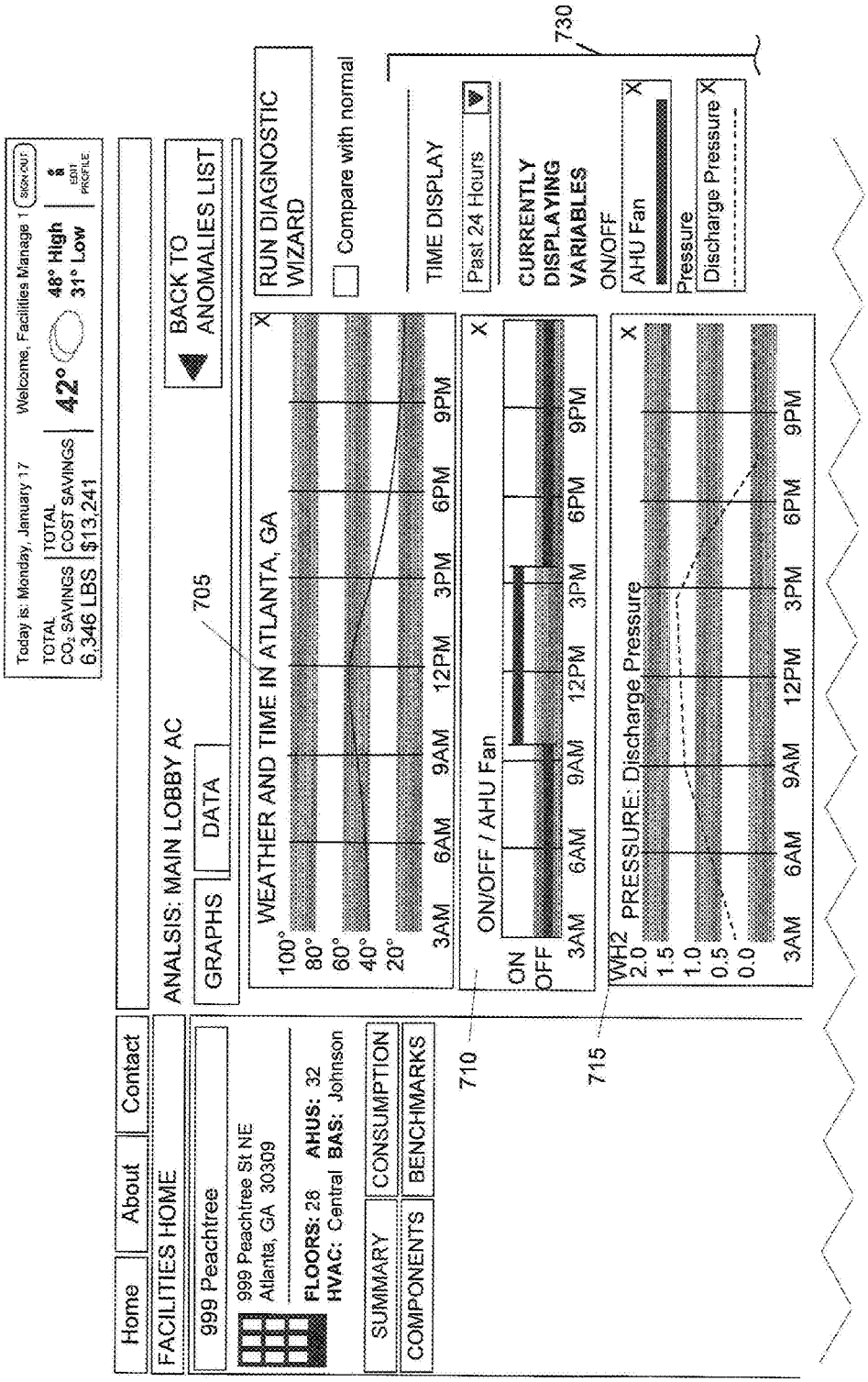

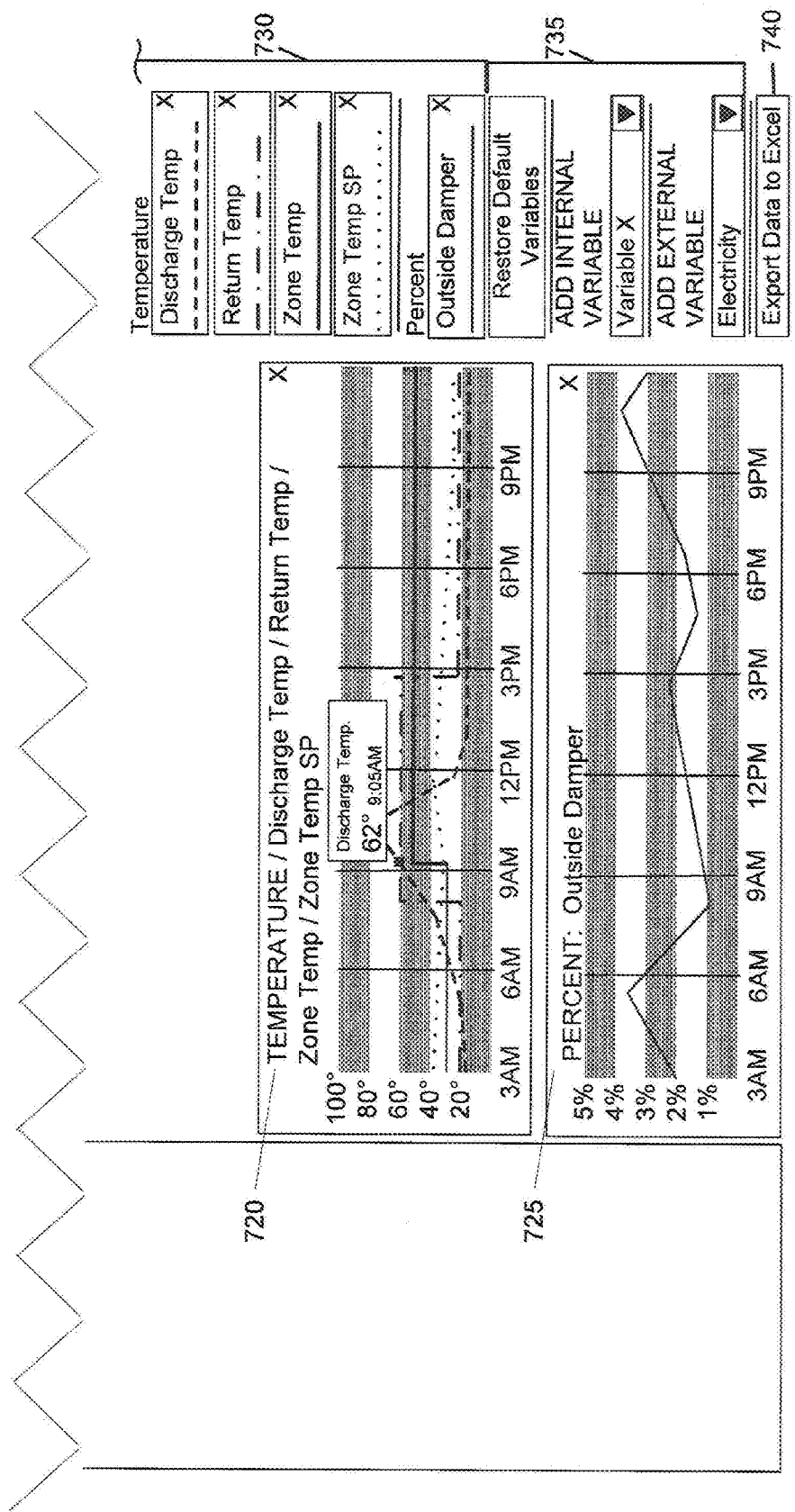

FIGURE 11 ically. Current
METHOD AND SYSTEM FOR MONITORING A BUILDING

CROSS-REFERENCE TO RELATED APPLICATIONS

This application claims the benefit of U.S. Provisional Application No. 61/539,291, filed Sep. 26, 2011, which is incorporated by reference in its entirety for all purposes.

BRIEF DESCRIPTION THE DRAWINGS

FIG. 1A illustrates a system for monitoring a building, according to an embodiment.

FIG. 1B illustrates details of the building monitoring system, according to an embodiment.

FIG. 2 illustrates a method for monitoring a building, according to an embodiment.

FIGS. 4 and 5 are screen shots illustrating a list of potential problems flagged by the building monitoring system for a particular building, according to an embodiment.

FIGS. 7A-7B and 9-11 are screen shots illustrating various analyses which may be displayed by the building monitoring system for a particular building, according to an embodiment.

DESCRIPTION OF EMBODIMENTS OF THE INVENTION

Figure 3:
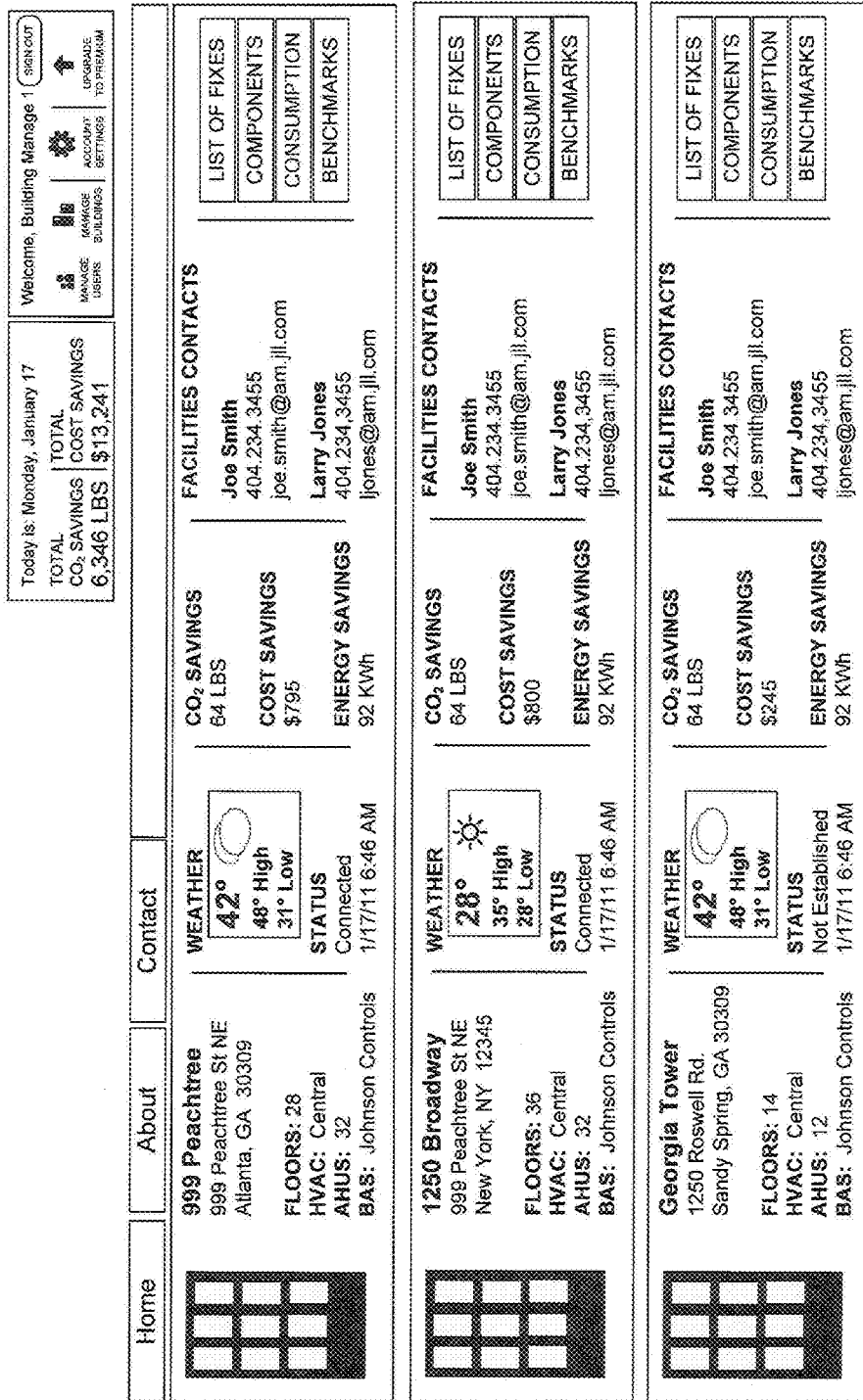
FIG. 3 is a screen shot illustrating a list of buildings managed by a single user, according to an embodiment.

FIG. 1A illustrates a system 100 for monitoring a building, according to an embodiment. In system 100, building and/or operational data may be entered and statistical model(s) based on the building and/or operational data may be generated. This can be done manually or automatically. Current building performance may be compared to the statistical model and it can be determined whether the current building performance is normal or abnormal. Information indicating abnormal and/or normal operating conditions may be displayed. The building and/or operational data may include, but is not limited to: building temperature set points, programmed building occupancy, settings for various utilities (e.g., HVAC, lighting, power, gas, water), weather events, or energy usage, or any combination thereof.

In FIG. 1A, a client 101 may communicate over a network 102 (e.g., intranet, Internet) with a server 103. The server 103 may communicate with a building monitoring system 104, either directly or indirectly through the network 102. A client facility 108 may communicate using client 101. Information from various third party data sources 105 (e.g., weather data source, utility usage data source), third party networks 106 (e.g., LEED, EnergyStar), and other facilities 107 may be utilized in the building monitoring system 104. The server 103 and/or the client 101 may comprise a computer. A computer may be any programmable machine capable of performing arithmetic and/or logical operations. In some embodiments, computers may comprise processors, memories, data storage devices, and/or other commonly known or novel components. These components may be connected physically or through network or wireless links. Computers may be referred to with terms that are commonly used by those of ordinary skill in the relevant arts, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers.

FIG. 1B illustrates details of the building monitoring system 104, according to an embodiment. The building monitoring system 104 may include, but is not limited to: setup/maintenance screen 135, user interface screens 140, database 130, or various modules (e.g., abnormal activity monitoring module 120, pattern recognition monitoring module 150, visualization module 160), or any combination thereof. The setup/maintenance screens 135 may be utilized by an administrator to set up or maintain the building monitoring system 104. The user interface screens 140 may be utilized by a user to interface with the building monitoring system 104. The database 130 may be utilized to store data. The abnormal activity monitoring module 120 may be utilized to flag building units and time periods that exhibit abnormal operation, and do not conform to existing known conditions as stored in the pattern recognition module. The pattern recognition monitoring module 150 may be utilized to tag building units and time periods with specific problems or issues that match known conditions uncovered by a user. Diagnostic tools may also be utilized. For example, diagnostic tools such a visualization and grid tools (e.g., shown in FIGS. 3-7B) may be utilized. The diagnostic tools may, in an embodiment, allow a user (e.g., building operator) to, for example: plot one unit against another; one floor against another; or one data element against another; or any combination thereof. Because a user may look at a combination of floors, units and data elements over time, the user may have the ability to form a hypothesis about what is causing an error. In another embodiment, a user may run a series of checks that would perform auto-diagnostics on the data. For example, a user may search for: cases where the fan motor was on but the temperature didn't change; or cases uses where cooling was being provided but the duct was completely closed off; or any combination thereof. The diagnostic tools may be stored in the form of a formula. The formula may describe how the various data elements were expected to be related in a "normal" condition and a name for the when the check failed (e. "stuck motor").

The visualization module 160 may be utilized to examine operation of building units and sensors, drill down on problematic areas indicated by the abnormal activity or pattern recognition module, and aid the user in diagnosing and entering conditions that are indicative of problems and their root causes. For example, when checks are set up to run (e.g., manually, automatically), the visualization module 160 may highlight data that doesn't fit expectations and display a name for the failure condition.

FIG. 2 illustrates a method 200 for monitoring a building, according to an embodiment. FIG. 2 illustrates a method for visualizing building operation data and capturing implicit user feedback of sensor reading patterns that are indicative of problems may be utilized. This allows the user to group sets of readings together as the user investigates potential issues that are flagged by learned models. The user can then tag these sensor reading patterns with root causes.

Referring to FIG. 2, in 205, the user may log into the building management system 104. In 210, the user may see a list of buildings that the user has permission to manage. FIG. 3 illustrates a list of buildings managed by a single user. The user can choose to examine data from a building from the list of buildings. The data may include a list of fixes, components, consumption, and benchmarks.

In 215, the user may select a building from their list to manage. FIGS. 4 and 5 illustrate a building that the user has chosen to manage: 999 Peachtree. In 220, the user may see a list of anomalies for the selecting building(s). The anomalies may be generated by utilizing various sensor readings related to the activity being monitored (e.g., if we detect that the heating stage activated for a floor, but the temperature does not reach the desired temperature set point, this may indicate a potential problem with the heating stage), ambient measurements (e.g., building occupancy, outside weather, gross energy usage), etc. The various sensor readings, ambient measurements, etc. may be collected by the entity running the system 100, or by another entity. The collected information may then be reviewed by the abnormal activity monitoring module 120, which may recognize normal building operations and flag potential anomalies. To recognize normal activity, abnormal activity monitoring module 120 may use machine learning algorithms to learn a probability distribution over all possible activity patterns of the building throughout the day. Example algorithms include, but are not limited to: neural networks and dynamic Bayesian networks (e.g., hidden markov models). The utilized algorithm may generate a score that indicates how likely activity for various components of a building was at different points in time. In conjunction with anomalies supplied by the abnormal activity monitoring module 120, the pattern recognition monitoring module 150 may also generate a list of anomalies. The difference between the anomalies generated by abnormal activity monitoring module 120 and pattern recognition monitoring module 150 may be that the anomalies detected by abnormal activity monitoring module 120 may be generated directly from a machine learning algorithm without human intervention. Anomalies recognized by pattern recognition module 150 may be directly entered by a user. The anomalies may then be ordered by degree (e.g., of seriousness) of the anomaly and/or by date.

Figure 9:
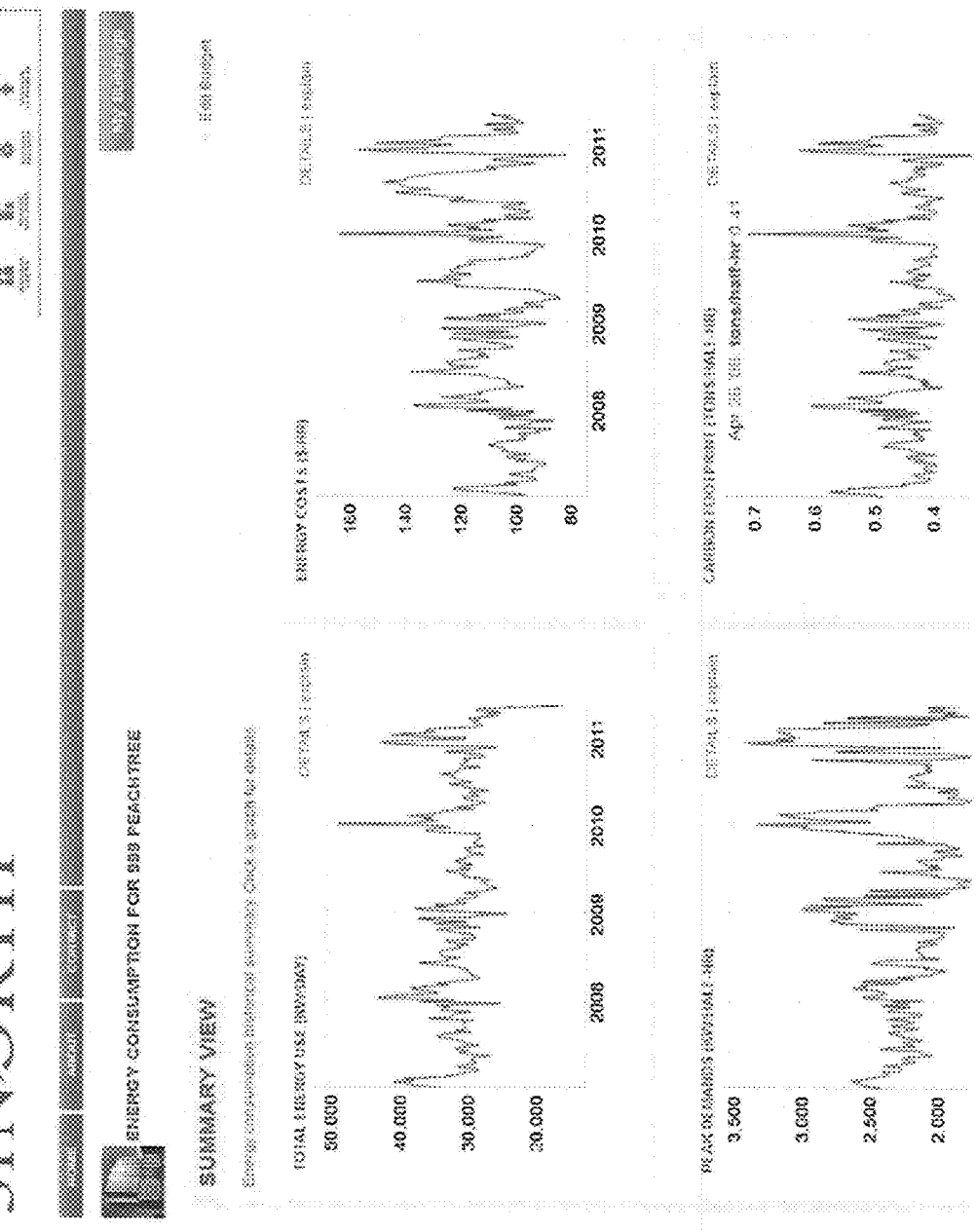

FIG. 4 illustrates a list of potential problems flagged by system 100 for a particular building, along with the estimated impact or result of the problems along several dimensions (e.g., cost, environmental impact), according to an embodiment. Section 405 illustrates which building the user is viewing, along with buttons to access the summary (e.g., see FIG. 9), components (e.g., see FIGS. 7A-7B), consumption (e.g., tracking actual power usage versus system performance to see what a building received in return for used energy) and benchmark (e.g., how user's building compares to various benchmarks, such as a best performing building) areas. Section 410 illustrates summary information showing different anomalies detected for the building selected. Each anomaly may described by the system component name 415 (e.g., automation), type of system 420 (e.g. HVAC), when the anomaly was detected 425, estimated overall impact of the anomaly on building operation 430, and a breakdown of expected savings for fixing the problem (e.g., in terms of carbon emissions 435, dollars 440, and energy usage 445).

For example, FIG. 5 illustrates the same list of potential issues as shown in FIG. 4, but with buttons that allow the user to select a particular anomaly to review or diagnose, and a recommended course of action, according to an embodiment. In section 505, a recommended action is shown, along with analyze action and fix action buttons.

Referring back to FIG. 2, in 225, the user may select an anomaly to review. In 230, the user may see a graph and/or a table that displays the various data points gathered for the anomaly in question, along with the values considered "normal". FIGS. 7A-7B illustrates multiple readings for the same unit over a period of time where an anomalous condition was detected. FIGS. 7A-7B may be generated by illustrating pre-calculated data elements over time for a certain anomaly. The data may include, but is not limited to: weather and time 705, status 710 (e.g., on, off), pressure 715, temperature 720, and percent 725 (e.g., 0-100). The weather and time 705 may show the weather (e.g., in degrees) at various times. The status 710 may show whether an element was on or off at various times, and may be represented, for example, as colored shading of the entire graph region for an "on" time period, and as a different color for an "off" time period. The pressure 715 may show the pressure of an element at various times. The temperature 720 may show the various temperature of an element or a building at various times. The percent 725 may show an important percentage number, such as, in this example the percentage of humidity outside the damper.

In 235, the user may hide the data elements that seem correct (e.g., values for the "normal" units), leaving only those that indicate system malfunction. This may be done, for example, by right clicking and choosing various data elements to view or hide. The user may also define relationships between data elements that the user would like to see (e.g., how space temperature is related to supply air temperature). The user may view this information in a graph format. For example, the user may determine potential unusual building operating conditions that directly impact energy utilization by requesting units and times when both the building operation has been flagged and energy usage is outside expected ranges.

Figure 6:
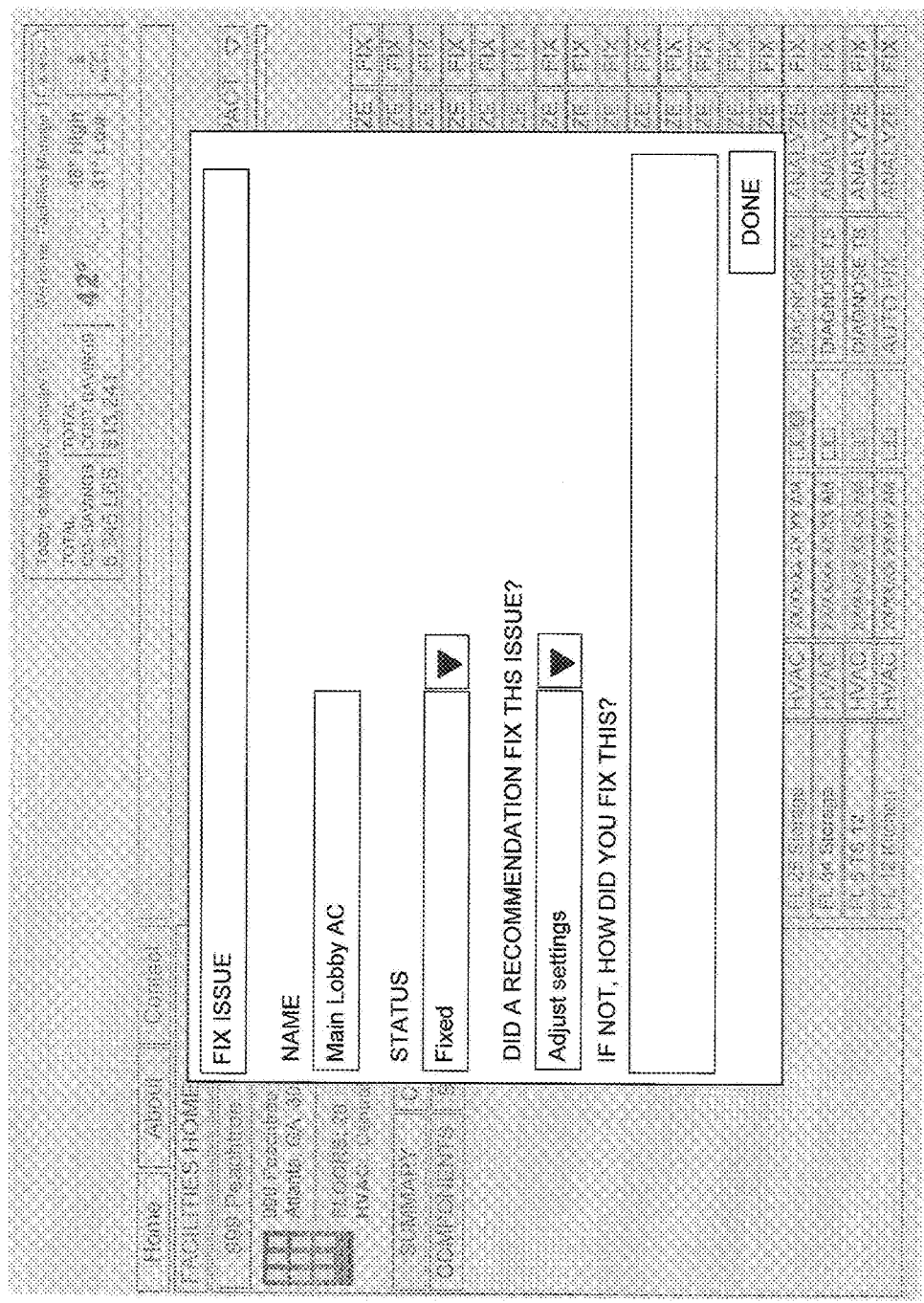
FIG. 6 is a screen shot illustrating feedback for fixed potential problems flagged by the building monitoring system for a particular building, according to an embodiment.

In 240, the user may enter a hypothesis and/or a category for the anomaly. The user may, for example, manually enter information about this anomaly (e.g., root cause, potential fixes). FIG. 6 illustrates a chosen anomaly "Main Lobby AC", and shows one embodiment of user feedback that system 100 allows: flagging whether the recommended action was appropriate or not. For example, in the example in FIG. 6, a user can indicate that the status of the issue is fixed, whether or not a recommendation fixed the issue, and if a recommendation did not fix the issue, how the user did fix the issue. There are many other possible ways for the user to provide tags to particular anomalies, such as root causes and recommended courses of action. Examples of root causes may include, but are not limited to: malfunctioning sensors, equipment breakdown, etc. Examples of recommended actions may include, but are not limited to: checking or adjusting the operational settings of parts of the system, scheduling maintenance to examine the situation further, etc.

In 245, it may be determined whether the hypothesis is confirmed by looking at the physical components in question. This may require hands-on examination by a user (e.g., the building operator of the unit in question), or adjusting the building operation in response to the proposed hypothesis and seeing if building operation changes in the expected way. If the hypothesis is confirmed, in 250 the user may mark the anomaly as resolved, and the anomaly may then be removed from the list. If the hypothesis is not confirmed, the process 200 may be repeated fully or partially.

Figure 8:
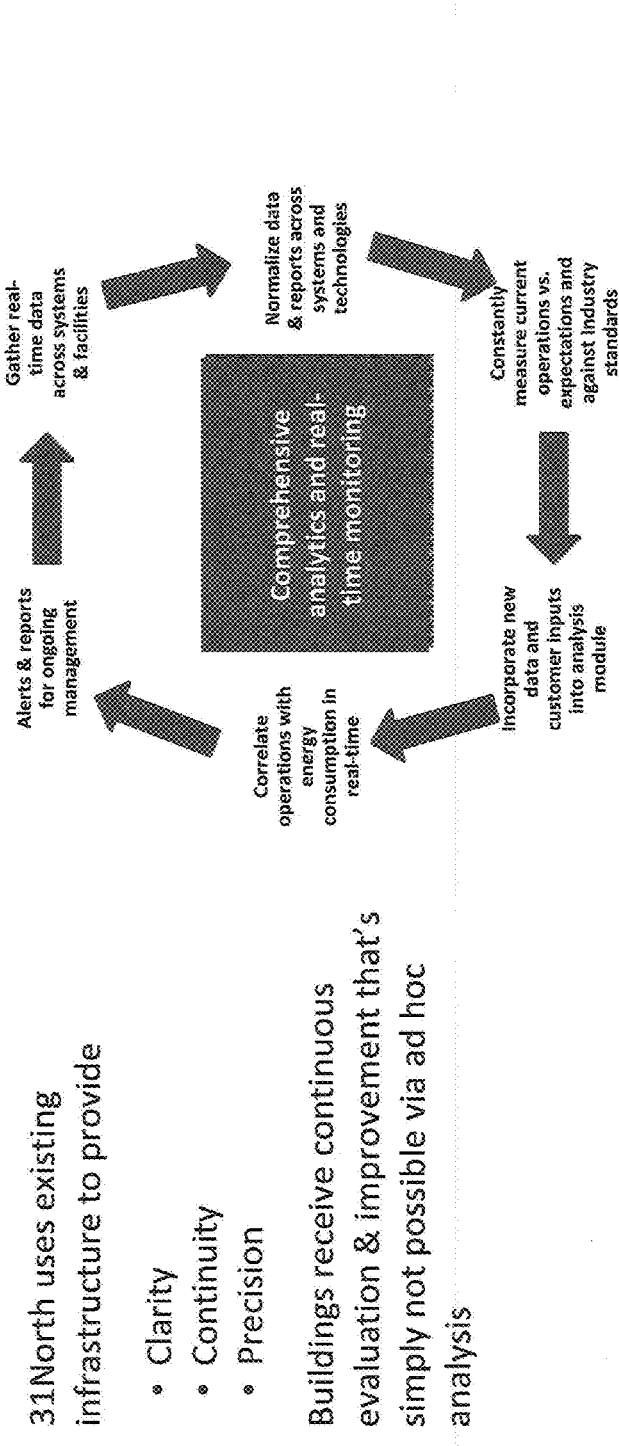
FIG. 8 is illustrates a continuous improvement cycle, according to an embodiment.

In one embodiment, a continuous improvement cycle may be utilized, as shown in FIG. 8. Real-time data across system and/or facilities may be gathered, normalized and compiled into reports. Current operations versus expectations and industry standards may be constantly measured and input into the system 100. Operations with energy consumption in real-time may be correlated in the system 100 as well. Finally, alerts and reports can be provided for ongoing management.

For example, the system 100 may learn expected energy utilization for a building based on stored sensor readings, occupancy signals, energy utilization, and environmental signals. The abnormal activity monitoring module 120 and the pattern recognition monitoring module 150 may then be used for detecting periods of time when energy usage fails outside of normal levels.

In another example, user-generated unusual patterns and root causes may be stored, and a more general machine learned model may be learned from the stored patterns that identify specific root causes. For example, a standard binary classification problem may be created by constructing a database of positive examples by finding readings that are flagged for a specific root cause, and random normal readings, and training a classification algorithm (e.g., support vector machine (SVM)) to discriminate between the two. The learned classifier may then tag units and periods of time in the building with known issues.

For example, in an embodiment, sensor readings of building data may be utilized as input, and a score that is indicative of normal or anomalous operating conditions may be output. In order to determine whether normal or anomalous operating conditions exist, a dynamic Bayesian network (e.g. a hidden markov model) that computes the probability of observing a sequence of sensor readings over a period of time may be utilized.

Figure 10:
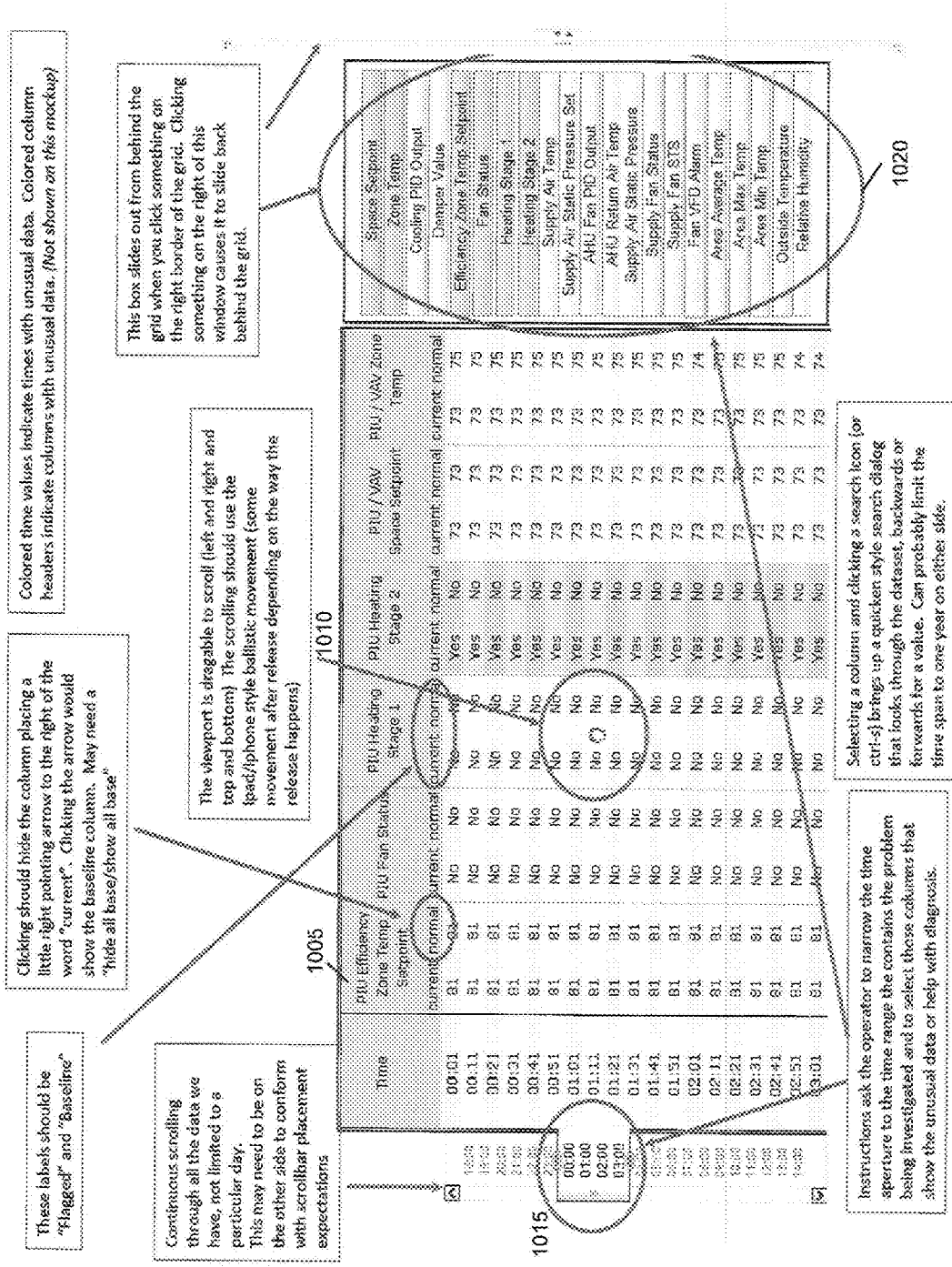
Figure 11:
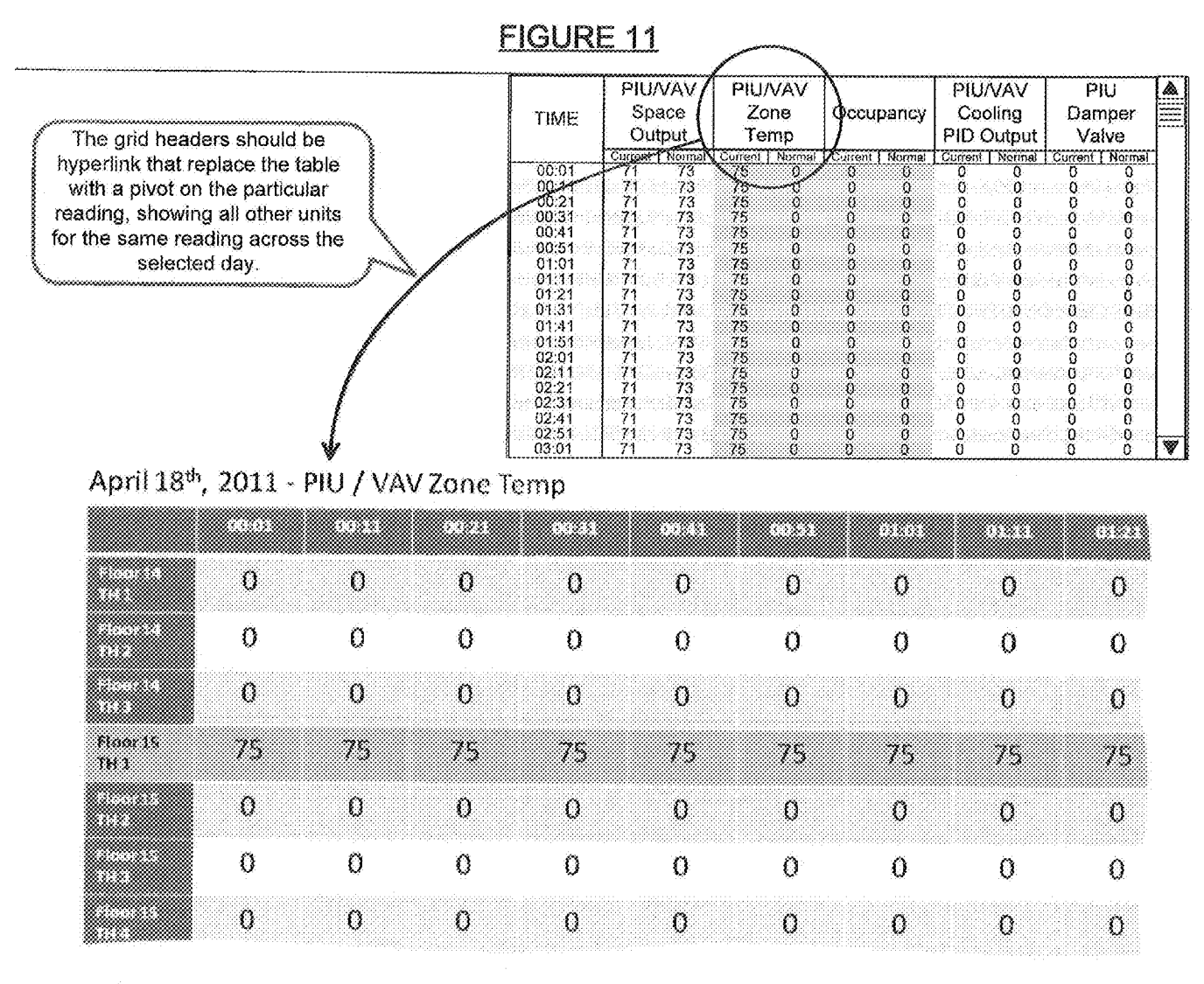

FIGS. 10 and 11 illustrate various types of analysis that may be shown, according to an embodiment. In FIG. 10, various types of analysis are shown according to the time. For example, in 1005, the PIU efficiency zone temperature set point may be shown at the current and normal values (these may also be called flagged and baseline). Clicking on one of the values, such as the normal values link, may hide the column and place a right pointing arrow to the right of the word "current". Clicking on this arrow may show the column again. Colored time values may indicate times with unusual data. Colored column headers may show column with unusual data. As shown in 1010, a viewport may be dragable to scroll (e.g., left and right and top and bottom). The scrolling may use the ipad/iphone style ballistic movement. In 1015, a user may narrow the time aperture to a time range that contains the problem being investigated and may select those columns that show the unusual date or help with the diagnosis. In 1020, a box may slide out from behind the grid when the user clicks something on the border of the grid. Clicking on the right of this window may cause the window to slide back behind the grid.

FIG. 11 illustrates another user screen shot. In this screen shot, a user may click on a grid header that is a hyperlink and that may cause the current table being viewed to be replaced with a pivot on the particular reading, showing all other units for the same reading across a particular time period (e.g., a day). Thus, using features shown in FIGS. 10 and 11, the user may access many types of information using the same window.

Several examples of use cases of embodiments of the invention will now be discussed. These examples help illustrate, for example, the customer ability to control commercial building operations and minimize costs (e.g., in the short, medium, and long term).

Optimize Building Utility Consumption.

Ideal building operation may use the least amount of utility resources (e.g., power, natural gas, water) given external conditions (e.g., weather) within the constraints set by the building operators (e.g., comfortable temperature, relative humidity, etc.). In an embodiment, optimization may be supported in the following way.

A statistical model of expected building behavior may be constructed using a variety of inputs such as current building sensor readings, current system configuration data, historical performance data for the building, data for other buildings in the area, data for other buildings experiencing similar weather conditions, manufacturer's specifications on expected equipment behavior, building specifications like age, height, construction materials, current utility costs, etc. Because the data store may be centralized in the cloud, it may be capable of using data from more than one building in more than one location to build its model.

These inputs (e.g., from more than one building) may be normalized and standardized across the disparate data sources and stored in a raw data store. The raw data store may be further processed by summarization and transformation routines which may populate a data warehouse. Raw data and data summaries from the data warehouse may be fed into a number of regression algorithms (e.g., neural networks, support vector regression machines, or gradient boosted decision trees, or any combination thereof). The output of these regression algorithms may comprise the building behavioral model.

Using the behavioral model as a foundation, modifications may be made to the configuration data in the model and a series of searches may be run (e.g., perturbative gradient search, genetic algorithms, or A*, or any combination thereof) to find the building configuration expected to provide the lowest overall utility consumption, given current conditions, while still meeting operational requirements. Not only may multiple algorithms be used, a variety of predictions for weather conditions may be used in order to account for the delta between forecasted weather and actual weather. Another set of algorithms (e.g., epsilon greedy) may help ensure that the recommended changes in configuration recommended are unlikely to produce disruptive differences in building behavior.

Once an optimal configuration has been identified, a series of data visualizations designed to communicate system state effectively to building operators may be created. These visualizations may comprise: past performance, expected performance, optimal configuration, or difference between optimal configuration and current configuration, or any combination thereof. The visualizations may also serve to highlight anomalies between: current expectations for buildings and historical performance, current building(s) and other buildings in the region, particular sub-sections of an individual building, or comparable sub-sections in different buildings, or any combination thereof. These anomalies may be evidence of failing or misbehaving components and may be valuable in directing the response of the building maintenance team.

Building operators may use the output of the system 100 in a number of ways. In an embodiment, the configuration recommendations may be directly connected to the building control systems. In this configuration, the building may automatically and continuously optimize its performance providing low overhead, better adaptation to novel conditions and better flexibility at the lowest possible consumption levels. However, in some embodiments, operators may also make changes to the proposed configuration parameters before applying them to the building. This may provide flexibility for the operator and may offer operators an opportunity to apply information that they may have that hasn't been accounted for by the model.

The model's predictions, the changes made by operators, and the actual results may be stored by the system 100 and applied to future models and recommendations. As a result, the system's recommendations may improve over time.

Simulate Different Scenarios for Consumption/Cost.

In addition to providing assistance with maintenance decisions and continuous building configuration, the system 100 may help prioritize building system upgrades, policy decisions, utility usage mix, etc. The system 100 may automatically combine data from other buildings with different configurations with the data from the building under review to model and prioritize possible changes. The new configurations may be ordered by impact, cost to change, cost against impact, etc. This output may be used to prioritize component upgrades and replacements, policy changes, energy mix decisions, energy buying decisions, etc. Operators may also directly experiment with changes in the modeled building configuration, modeled control values, and modeled constraints directly and see, via the visualization layer, the impact of these changes.

Optimize Utility Source Selection.

Currently, building operators must balance factors such as electric and natural gas use and water consumption and select the most optimal pricing plan for each utility. Over time, there may be greater choice over energy source selection. Solar, methane gas, stored energy, wind, shared and distributed generation, micro-grids, virtual power plants, etc. may become possible sources of a building's utility requirements. Operators may use the system 100 to support these decisions in the following way.

In addition to the information collected and used for the first two scenarios, the system 100 may collect data on the pricing structures associated with all possible utility choices. Using this data and configured conversion formulae, the system 100 may be able to estimate the expected cost associated with any predicted energy use. The operator may be able to select the energy alternatives to be considered by the system.

The system 100 may then use the model built above, ancillary data (e.g., weather forecasts and weather history) and regression algorithms (e.g., neural networks, support vector regression machines and gradient boosted decision trees) to simulate building operation over the course of a series of time periods (e.g., days, months, quarters, year) using various combinations of the energy alternatives under review.

The results of these simulations may be presented to the operator using the visualization layer. The display may contain best case and worst case scenarios for expected climate, best case and worst case scenarios for expected building deterioration, and may also factor in the cost and impact of planned building upgrades. By evaluating the expected performance of the options tested against the projected cost in both fixed and variable terms, the optimal combination of utility sources may be selected.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than those shown. For example, the elements in the flowcharts may be performed in parallel or in a different order.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

It should also be noted that the terms "a", "an". "the", "said". etc. signify "at least one" or "the at least one" in the application (e.g., specification, claims and drawings). In addition, the term "comprising" signifies "including, but not limited to".

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A computerized method for providing information related to monitoring at least one first building, comprising;
   accepting historical data comprising building operational sensor data for at least one first building and/or at least one second building using at least one sensor;
   accepting historical user input data comprising user input regarding root cause information for historical abnormal operating conditions using at least one sensor;
   accepting current building operational sensor data for the at least one first building;
   generating at least one statistical model based on the current building operational sensor data and the historical data using at least one processor;
   comparing current building performance to the at least one statistical model using the at least one processor;
   determining whether the current building performance is normal or abnormal using the at least one statistical model; and
   displaying information indicating abnormal and/or normal operating conditions using the at least one processor;
   when the current building performance is abnormal, flagging at least one abnormal operation condition, comparing the root cause information of the historical abnormal operation conditions to the at least one abnormal operating condition, and making at least one recommendation on how to address the at least one flagged abnormal condition.

2. The method of claim 1, further comprising: but not limited to:
   grouping flagged abnormal operating conditions together; and
   tagging the flagged abnormal operating conditions with root cause information.

3. The method of claim 1 further comprising, wherein the displaying includes, but is not limited to:
   a dynamic display;
   a static graph display; or
   a table display; or
   any combination thereof.

4. The method of claim 2 further comprising, further including, but not limited to:
   storing the grouped flagged abnormal operating conditions and/or the root cause information.

5. The method of claim 1 further comprising; but not limited to determining expected energy utilization for the building based on information comprising:
   pricing information;
   maintenance of equipment information;
   sensor readings;
   occupancy signals;
   energy utilization; or environmental signals; or
any combination thereof.

6. The method of claim 1 further comprising; but not limited to:
determining abnormal building operating conditions that potentially directly impact energy utilization by utilizing flagged abnormal operating conditions and abnormal energy usage.

7. The method of claim 5, wherein:
the information is historical, current, or theoretical, or any combination thereof;
the data is used to improve the statistical model;
the data also includes, but is not limited to: weather data, or building energy use data, or any combination thereof; or
the building energy use data includes, but is not limited to: HVAC data, lighting data, power data, gas data, or water data, or any combination thereof; or
any combination thereof.

8. The method of claim 6 further comprising; but not limited to:
predicting failure of at least one building system component;
determining repair, maintenance, or review measures, or any combination thereof;
predicting usage; or
determining pricing strategies; or
any combination thereof.

9. The method of claim 1 further comprising; but not limited to:
allowing operators to make changed to proposed configuration parameters; and/or
applying proposed configuration parameters to building control systems.

10. The method of claim 1 further comprising; but not limited to predicting current building performance based on:
proposed configuration parameters;
historical data; or
forecast data; or
any combination thereof.

11. The method of claim 1, further comprising:
estimating expected cost of the at least one first building associated with future predicted energy use.

12. The method of claim 1, wherein future performance of the at least one first building is simulated.

13. The method of claim 1, wherein the at least one processor comprises: at least one server, at least one PC, at least one mobile device, or any combination thereof.

14. A computerized system for providing information related to monitoring at least one first building, comprising;
a processor configured for:
accepting historical data comprising building operational sensor data for at least one first building and/or at least one second building using at least one sensor;
accepting historical user input data comprising user input regarding root cause information for historical abnormal operating conditions using at least one sensor;
accepting current building operational sensor data for the at least one first building;
generating at least one statistical model based on the current building operational sensor data and the historical data;
comparing current building performance to the at least one statistical model;
determining whether the current building performance is normal or abnormal using the at least one statistical model; and
displaying information indicating abnormal and/or normal operating conditions;
when the current building performance is abnormal, flagging at least one abnormal operation condition, comparing the root cause information of the historical abnormal operation conditions to the at least one abnormal operating condition, and making at least one recommendation on how to address the at least one flagged abnormal condition.

15. The system of claim 14, wherein the processor is further configured to; group flagged abnormal conditions together; and
tagging the flagged abnormal operating conditions with root cause information.

16. The system of claim 14, wherein the display further comprises;
a dynamic display;
a static graph display; or
a table display; or
any combination thereof.

17. The system of claim 15, wherein the processor is further configured for:
storing the grouped flagged abnormal operating conditions and/or the root cause information.

18. The system of claim 14, wherein the processor is further configured for determining expected energy utilization for the at least one first building based on information comprising:
pricing information;
maintenance of equipment information;
sensor readings;
occupancy signals;
energy utilization; or
environmental signals; or
any combination thereof.

19. The system of claim 14, wherein the processor is further configured for:
determining abnormal building operating conditions that potentially directly impact energy utilization by utilizing flagged abnormal operating conditions and abnormal energy usage.

20. The system of claim 18, wherein:
the information is historical, current, or theoretical, or any combination thereof;
the data is used to improve the statistical model;
the data also includes, but is not limited to: weather data, or building energy use data, or any combination thereof; or
the building energy use data includes, but is not limited to: HVAC data, lighting data, power data, gas data, or water data, or any combination thereof; or
any combination thereof.

21. The system of claim 19, wherein the processor is further configured for:
predicting failure of at least one building system component;
determining repair, maintenance, or review measures, or any combination thereof;
predicting usage; or
determining pricing strategies; or
any combination thereof.

22. The system of claim 14, wherein the processor is further configured for:
allowing operators to make changed to proposed configuration parameters; and/or
applying proposed configuration parameters to building control systems.

23. The system of claim 14, wherein the processor is further configured for predicting current building performance based on:
- proposed configuration parameters;
- historical data; or
- forecast data; or
- any combination thereof.

24. The system of claim 14, further comprising:
- estimating expected cost of the at least one first building associated with future predicted energy use.

25. The system of claim 14, wherein future performance of the at least one first building is simulated.

26. The system of claim 14, wherein the at least one processor comprises: at least one server, at least one PC, at least one mobile device, or any combination thereof.

* * * * *